(12) United States Patent
Ko

(10) Patent No.: US 8,977,468 B2
(45) Date of Patent: Mar. 10, 2015

(54) SOLENOID VALVE CONTROL APPARATUS AND METHOD

(71) Applicant: Mando Corporation, Pyeongtaek-si, Gyeonggi-do (KR)

(72) Inventor: Soo-Hyun Ko, Suwon-si (KR)

(73) Assignee: Mando Corporation, Gyeonggi-Do (KR)

( * ) Notice: Subject to any disclaimer, the term of this patent is extended or adjusted under 35 U.S.C. 154(b) by 0 days.

(21) Appl. No.: 14/253,329

(22) Filed: Apr. 15, 2014

(65) Prior Publication Data

US 2014/0309904 A1    Oct. 16, 2014

(30) Foreign Application Priority Data

Apr. 15, 2013    (KR) ........................ 10-2013-0041033

(51) Int. Cl.
  *B60T 15/28*   (2006.01)
  *B60T 8/50*    (2006.01)
  *B60T 15/02*   (2006.01)

(52) U.S. Cl.
  CPC ............. *B60T 8/5075* (2013.01); *B60T 15/028* (2013.01)
  USPC .......................................................... 701/78

(58) Field of Classification Search
  USPC .......................................................... 701/78
  See application file for complete search history.

(56) References Cited

U.S. PATENT DOCUMENTS

| | | | | |
|---|---|---|---|---|
| 4,314,340 A * | 2/1982 | Miki et al. | ...................... | 701/62 |
| 6,122,585 A * | 9/2000 | Ono et al. | ....................... | 701/71 |
| 6,182,001 B1 * | 1/2001 | Sugai et al. | ...................... | 701/78 |
| 6,341,826 B2 * | 1/2002 | Onogi | ........................... | 303/112 |
| 6,612,662 B2 * | 9/2003 | Ohtsu | ........................... | 303/156 |
| 7,409,280 B2 * | 8/2008 | Nakamura et al. | ............. | 701/70 |
| 8,444,230 B2 * | 5/2013 | Ikematsu et al. | .............. | 303/156 |
| 8,589,016 B2 * | 11/2013 | Bange et al. | ................. | 701/29.1 |

FOREIGN PATENT DOCUMENTS

| | | |
|---|---|---|
| KR | 10-0184787 B1 | 12/1998 |
| KR | 10-2007-0062275 A | 6/2007 |
| KR | 10-2010-0043607 A | 4/2010 |
| KR | 10-2011-0071560 A | 6/2011 |

OTHER PUBLICATIONS

Korean Office Action issued in Korean Application No. 10-2013-0041033 dated Apr. 29, 2014.

* cited by examiner

*Primary Examiner* — Thomas Tarcza
*Assistant Examiner* — Alex C Dunn
(74) *Attorney, Agent, or Firm* — McDermott Will & Emery LLP

(57) ABSTRACT

Disclosed herein are a solenoid valve control apparatus and method. The solenoid valve control apparatus to control a solenoid valve which include a solenoid coil and is opened and closed by current supplied to the solenoid coil, includes a switching unit which switches the current supplied to the solenoid coil, a pre-driver unit which outputs a driving signal to drive the switching unit, a current detection unit which detects the current flowing in the solenoid coil, and an MCU which controls the pre-driver unit so as to output the driving signal from the pre-driver unit to the switching unit such that a value of the current detected by the current detection unit reaches a target current value during current control of the solenoid valve and controls the pre-driver unit such that a frequency of the output driving signal is varied during output of the driving signal.

6 Claims, 3 Drawing Sheets

SOLENOID VALVE CONTROL APPARATUS AND METHOD

CROSS-REFERENCE TO RELATED APPLICATION

This application claims the benefit of Korean Patent Application No. 2013-0041033, filed on Apr. 15, 2013 in the Korean Intellectual Property Office, the disclosure of which is incorporated herein by reference.

BACKGROUND

1. Field

Embodiments of the present invention relate to a solenoid valve control apparatus and method, capable of reducing operation noise of a solenoid valve.

2. Description of the Related Art

In a general vehicle equipped with an electronically controlled brake system, for example an ABS (Anti-lock Brake System), solenoid valves are mounted to inlet and outlet sides of four wheels, respectively.

When such an ABS vehicle begins to slide by braking force thereof exceeding friction force between the wheels of the vehicle and the road surface, the solenoid valves of the associated wheels operate to decrease pressure. When the vehicle begins to be driven again, operation by which the solenoid valves operate to apply pressure to the wheels is continuously generated. The vehicle is stably braked without sliding owing to such ABS operation.

Each of the solenoid valves supplies or blocks brake oil pressure from the electronically controlled brake system to a wheel cylinder.

The solenoid valve is opened and closed by current supplied to a solenoid coil therein.

An existing solenoid valve control apparatus includes a shunt resistance unit which detects current flowing in a solenoid coil within a solenoid valve, a switching unit which switches the current flowing in the solenoid coil, a pre-driver which outputs a driving signal to the switching unit so as to turn the switching unit on/off, and an ECU which monitors the current flowing in the solenoid coil through the shunt resistance unit and controls the switching unit through the pre-driver such that target current flows in the solenoid coil based on the monitored result.

In the related art, the ECU outputs a driving signal having a fixed frequency to the switching unit through the pre-driver while controlling current flowing in the solenoid coil such that the current reaches target current.

As a result, acoustic noise having the same frequency may be caused even in a solenoid valve assembly.

SUMMARY

Therefore, it is an aspect of the present invention to provide a solenoid valve control apparatus and method, which vary a frequency of a driving signal output to a switching unit during current control of a solenoid valve so as to reduce acoustic noise of the solenoid valve.

Additional aspects of the invention will be set forth in part in the description which follows and, in part, will be obvious from the description, or may be learned by practice of the invention.

In accordance with one aspect of the present invention, a solenoid valve control apparatus to control a solenoid valve which include a solenoid coil and is opened and closed by current supplied to the solenoid coil so as to regulate brake pressure supplied to a wheel cylinder, includes a switching unit which switches the current supplied to the solenoid coil, a pre-driver unit which outputs a driving signal to drive the switching unit, a current detection unit which detects the current flowing in the solenoid coil, and an MCU which controls the pre-driver unit so as to output the driving signal from the pre-driver unit to the switching unit such that a value of the current detected by the current detection unit reaches a target current value during current control of the solenoid valve and controls the pre-driver unit such that a frequency of the output driving signal is varied during output of the driving signal.

The MCU may control the pre-driver unit such that the frequency of the driving signal is continuously varied over time during output of the driving signal from the pre-driver unit to the switching unit.

The pre-driver unit may include a PI controller (Proportional-Integral controller) which outputs the driving signal to control the switching unit such that a current value subtracting the value of the current sensed by the current detection unit from the target current value input by the MCU is supplied to the solenoid coil, and a frequency varying device which varies the frequency of the driving signal output from the PI controller to the switching unit.

The MCU may control the frequency varying device such that the frequency of the driving signal is continuously varied over time during output of the driving signal from the PI controller to the switching unit.

In accordance with another aspect of the present invention, a solenoid valve control method of controlling a solenoid valve which include a solenoid coil and is opened and closed by current supplied to the solenoid coil so as to regulate brake pressure supplied to a wheel cylinder, includes outputting a driving signal to a switching unit which switches the current supplied to the solenoid coil such that the current flows in the solenoid coil during current control of the solenoid valve, detecting the current flowing in the solenoid coil, and outputting the driving signal to the switching unit such that a value of the detected current of the solenoid coil reaches a target current value and varying a frequency of the driving signal during output of the driving signal.

The solenoid valve control method may include outputting the driving signal to control the switching unit such that a current value subtracting the value of the detected current of the solenoid coil from the target current value through proportional-Integral control (PI control) is supplied to the solenoid coil, and varying the frequency of the driving signal such that the frequency of the driving signal is continuously varied over time during output of the driving signal.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
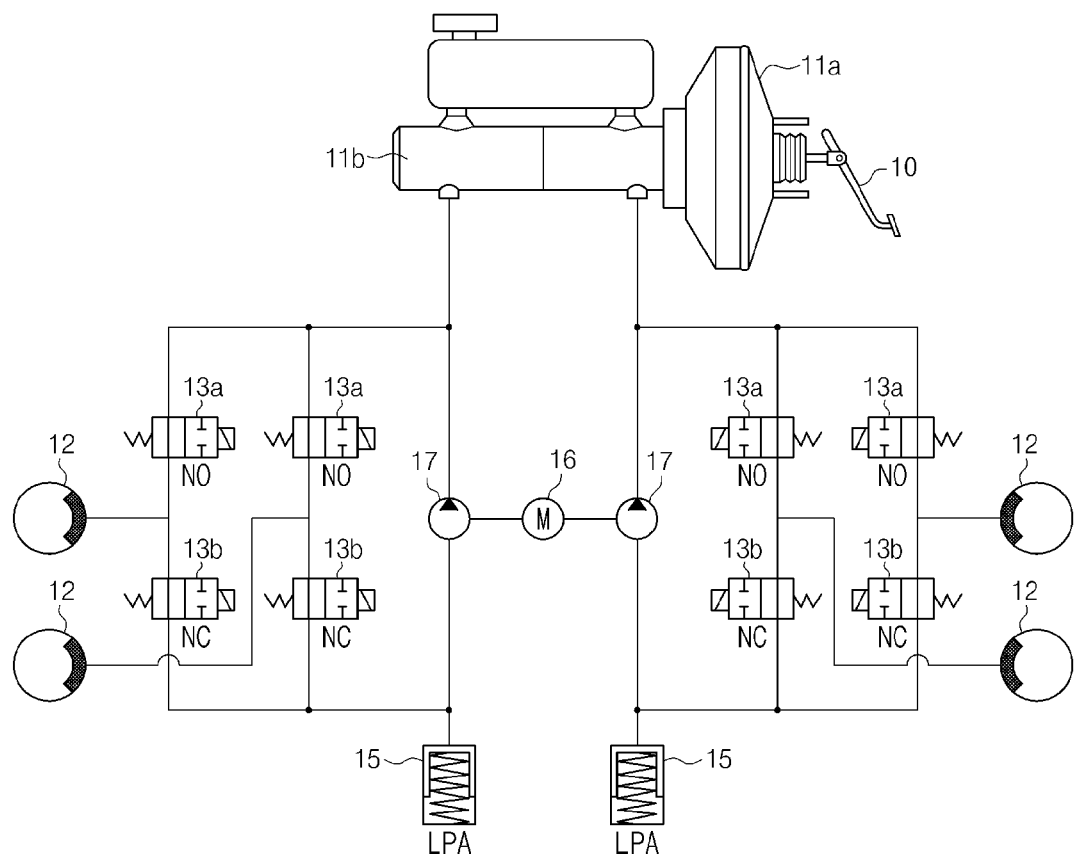
FIG. 1 is a hydraulic circuit diagram of an electronically controlled brake system to which a solenoid valve control apparatus according to an embodiment of the present invention is applied.

Reference will now be made in detail to the embodiments of the present invention, examples of which are illustrated in the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the drawings, the width, length, thickness, or the like of the component may be exaggerated, omitted, or schematically illustrated for convenience of description and clarity. Throughout the disclosure, like reference numerals refer to like parts throughout the various figures and embodiments of the present invention.

As used herein, the term "and/or" includes any and all combinations of one or more of the associated listed items. In addition, it will be understood that when an element is referred to as being "coupled/connected" to another element, it can be directly coupled or connected to the other element or intervening elements may also be present. As used in the specification and the appended claims, the singular forms "a", "an" and "the" are intended to include the plural forms as well, unless context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is a hydraulic circuit diagram of an electronically controlled brake system to which a solenoid valve control apparatus according to an embodiment of the present invention is applied.

Referring to FIG. 1, the electronically controlled brake system is provided with a brake pedal 10 operated by a driver during braking of a vehicle, and a booster 11a and a master cylinder 11b which amplify force transferred from the pedal 10 so as to generate brake oil pressure.

The hydraulic circuit diagram is provided with a plurality of first and second solenoid valves 13a and 13b to supply the brake oil pressure generated through the booster 11a to wheel cylinders 12, LPAs (low-pressure accumulators) 15 to temporarily store brake oil discharged from the wheel cylinders 12, and a motor 16 and pumps 17 which pump the brake oil stored in the LPAs 15 so as to return the brake oil to the master cylinder 11b or the wheel cylinders 12. These components are compactly installed in a modulator block.

The first and second solenoid valves 13a and 13b are respectively arranged at inlet and outlet sides of the wheel cylinders 12 in order to introduce or discharge brake oil pressure which is generated from the master cylinder 11b to be supplied to the wheel cylinders 12. Each of the first solenoid valves 13a is a normal-open (NO) valve which is maintained in an opened state during a normal state (off), and each of the second solenoid valves 13b is a normal-close (NC) valve which is maintained in a closed state during a normal state (off).

The first and second solenoid valves 13a and 13b are opened or closed during ABS (Anti-lock Brake System) braking of the vehicle so that brake pressure at the wheel cylinders 12 are decreased, maintained, or increased, thereby braking the vehicle.

In a case of increasing the brake pressure, the second solenoid valves 13b are closed and the first solenoid valves 13a are opened so that brake oil pumped by the motor 16 and the pumps 17 is supplied to the wheel cylinders 12.

In addition, in a case of decreasing the brake pressure, the first solenoid valves 13a are closed and the second solenoid valves 13b are opened so that brake oil in the wheel cylinders is discharged to the LPAs 15 so as to decrease the brake pressure in the wheel cylinders 12.

Figure 2:
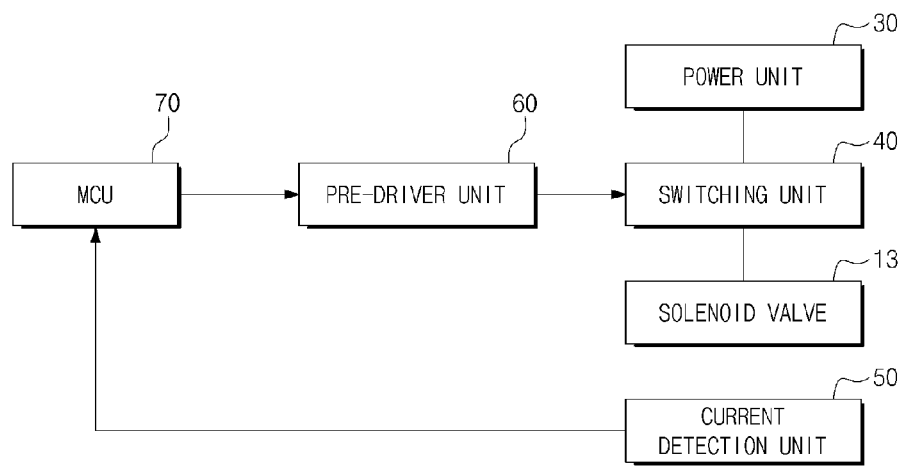
FIG. 2 is a control block diagram schematically illustrating the solenoid valve control apparatus according to the embodiment of the present invention.
Figure 3:
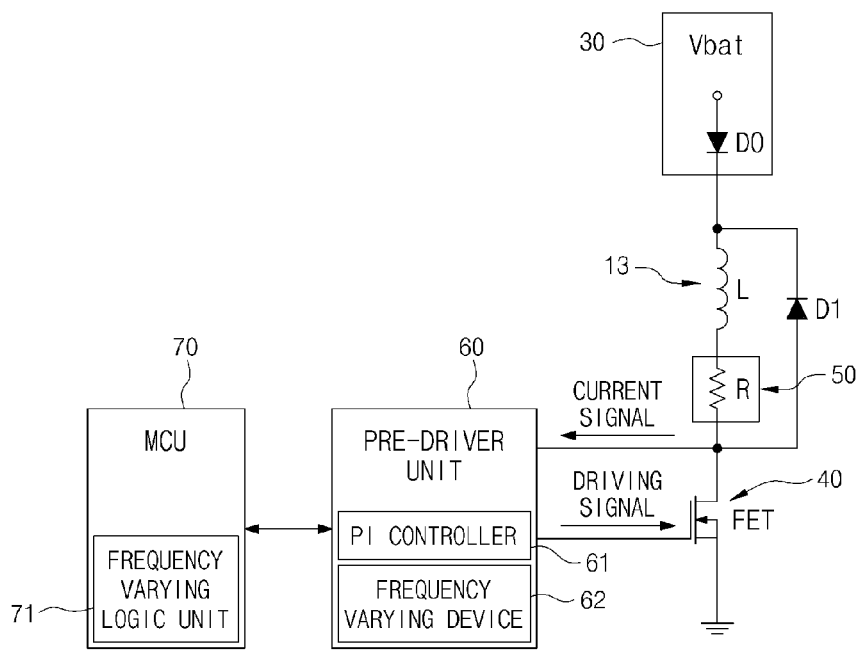
FIG. 3 is a control circuit diagram schematically illustrating the solenoid valve control apparatus according to the embodiment of the present invention.

FIG. 2 is a control block diagram schematically illustrating the solenoid valve control apparatus according to the embodiment of the present invention. FIG. 3 is a control circuit diagram schematically illustrating the solenoid valve control apparatus according to the embodiment of the present invention.

Referring to FIGS. 2 and 3, the solenoid valve control apparatus may include a power unit 30, a switching unit 40, a current detection unit 50, a pre-driver unit 60, and an MCU (Micro Control Unit) 70.

An ECU, which performs overall braking control of the vehicle, includes the pre-driver unit 60 and the MCU 70.

The power unit 30 includes a battery and supplies power to a solenoid valve 13.

The switching unit 40 switches current supplied from the power unit 30 to a solenoid coil L in the solenoid valve 13.

The current detection unit 50 detects the current supplied to the solenoid coil L. The current detection unit 50 may include a shunt resistor R connected to the solenoid coil L in series, and detect a voltage applied to both ends of the shunt resistor R so as to detect the current supplied to the solenoid coil L. For reference, D1 in the drawing is a free-wheeling diode.

The pre-driver unit 60 outputs a driving signal to drive the switching unit 40 in response to a control signal of the MCU 70. The pre-driver unit 60 controls the switching unit 40 such that a value of current flowing in the solenoid coil L reaches a target current value via PI control.

In addition, the pre-driver unit 60 includes a PI controller (Proportional-Integral controller) 61 and a frequency varying device 62.

In general, a controller performed by a control method which produces a control signal by multiplying an error signal as a difference between a command signal and a feedback signal and a properly proportional factor gain is referred to as a proportional controller. The PI controller is a controller performed by a control method which is used by parallel connection of proportional control and integral control producing a control signal by integrating an error signal.

The PI controller 61 outputs a driving signal to control the switching unit 40 such that a current value subtracting a value of current sensed by the current detection unit 50 from a target current value input by the MCU 70 is supplied to the solenoid coil L.

The frequency varying device 62 varies a frequency of the driving signal output from the PI controller 61 to the switching unit 40.

Figure 4:
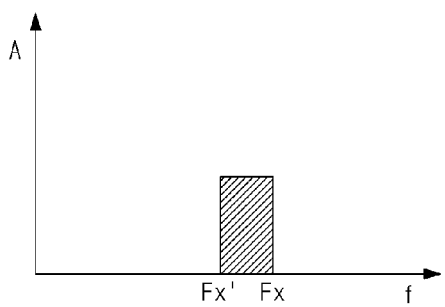
FIG. 4 is a graph for explanation of a variable frequency range of a driving signal in the solenoid valve control apparatus according to the embodiment of the present invention.

FIG. 4 is a graph for explanation of a variable frequency range of a driving signal in the solenoid valve control apparatus according to the embodiment of the present invention.

Referring to FIG. 4, a driving signal is not a fixed frequency but a variable frequency.

A variable frequency range is a preset frequency range ($F_{x'}$ to $F_x$).

That is, while a driving signal is output from the pre-driver unit 60 to the switching unit 40 such that the current value detected by the current detection unit 50 reaches a target current value during current control of the solenoid valve 13, a frequency of the driving signal is continuously varied within the frequency range of $F_{x'}$ to $F_x$.

Referring to FIG. 3 again, while a driving signal is output from the pre-driver unit 60 to the switching unit 40 such that the current value detected by the current detection unit 50 reaches a target current value during current control of the solenoid valve 13, the MCU 70 controls the frequency varying device 62 of the pre-driver unit 60 such that the frequency of the output driving signal is varied.

Thus, the frequency of the driving signal output to the switching unit 40 is changed without maintaining the same frequency value over time. Therefore, it may be possible to reduce acoustic noise of the solenoid valve.

The MCU 70 includes a frequency varying logic unit 71 which varies a frequency of a driving signal through the frequency varying device 62 of the pre-driver unit 60.

While a driving signal is output from the pre-driver unit 60 to the switching unit 40 such that the current value detected by the current detection unit 50 reaches a target current value during current control of the solenoid valve 13, the frequency varying logic unit 71 controls a frequency of the driving signal output from the pre-driver unit 60 to the switching unit 40 such that the frequency value is continuously varied over time.

Figure 5:
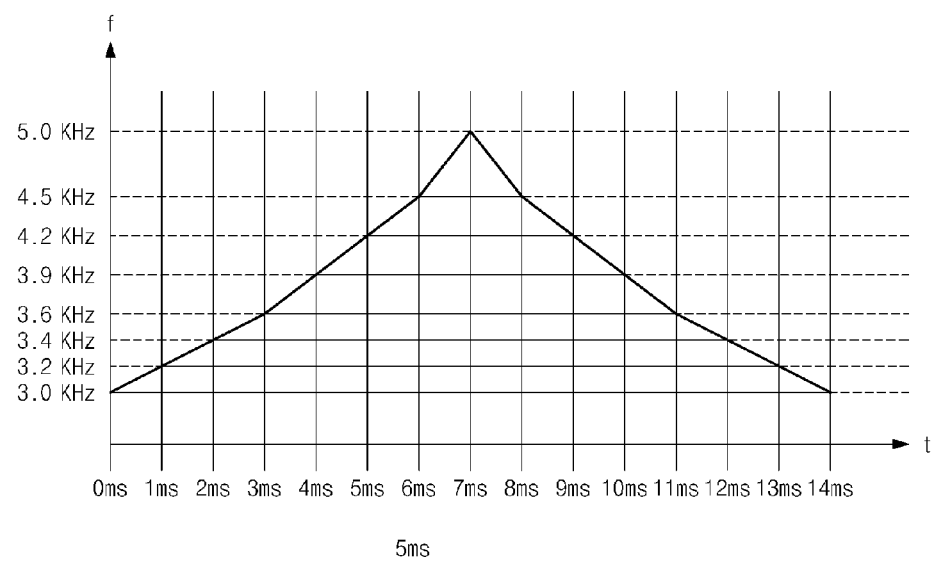
FIG. 5 is a graph for explanation of a variable frequency range with passage of time of a driving signal in the solenoid valve control apparatus according to the embodiment of the present invention.

FIG. 5 is a graph for explanation of a variable frequency range with passage of time of a driving signal in the solenoid valve control apparatus according to the embodiment of the present invention.

Referring to FIG. 5, a frequency of a driving signal may be varied in such a way that the frequency is increased from 3.0 KHz to 5.0 KHz for 0 ms to 7 ms and is then decreased from 5.0 KHz to 3.0 KHz for 7 ms to 14 ms.

As is apparent from the above description, embodiments of the present invention may vary a frequency of a driving signal output from a pre-driver to a switching unit when the switching unit is controlled such that current flowing in a solenoid coil reaches target current during current control of a solenoid valve so as to reduce acoustic noise of the solenoid valve.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A solenoid valve control apparatus to control a solenoid valve which include a solenoid coil and is opened and closed by current supplied to the solenoid coil so as to regulate brake pressure supplied to a wheel cylinder, the solenoid valve control apparatus comprising:
   a switching unit which switches the current supplied to the solenoid coil;
   a pre-driver unit which outputs a driving signal to drive the switching unit;
   a current detection unit which detects the current flowing in the solenoid coil; and
   an MCU which controls the pre-driver unit so as to output the driving signal from the pre-driver unit to the switching unit such that a value of the current detected by the current detection unit reaches a target current value during current control of the solenoid valve and controls the pre-driver unit such that a frequency of the output driving signal is varied during output of the driving signal.

2. The solenoid valve control apparatus according to claim 1, wherein the MCU controls the pre-driver unit such that the frequency of the driving signal is continuously varied over time during output of the driving signal from the pre-driver unit to the switching unit.

3. The solenoid valve control apparatus according to claim 1, wherein the pre-driver unit comprises a PI controller (Proportional-Integral controller) which outputs the driving signal to control the switching unit such that a current value subtracting the value of the current sensed by the current detection unit from the target current value input by the MCU is supplied to the solenoid coil, and a frequency varying device which varies the frequency of the driving signal output from the PI controller to the switching unit.

4. The solenoid valve control apparatus according to claim 3, wherein the MCU controls the frequency varying device such that the frequency of the driving signal is continuously varied over time during output of the driving signal from the PI controller to the switching unit.

5. A solenoid valve control method of controlling a solenoid valve which include a solenoid coil and is opened and closed by current supplied to the solenoid coil so as to regulate brake pressure supplied to a wheel cylinder, the solenoid valve control method comprising:
   outputting a driving signal to a switching unit which switches the current supplied to the solenoid coil such that the current flows in the solenoid coil during current control of the solenoid valve;
   detecting the current flowing in the solenoid coil; and
   outputting the driving signal to the switching unit such that a value of the detected current of the solenoid coil reaches a target current value and varying a frequency of the driving signal during output of the driving signal.

6. The solenoid valve control method according to claim 5, comprising outputting the driving signal to control the switching unit such that a current value subtracting the value of the detected current of the solenoid coil from the target current value through proportional-Integral control (PI control) is supplied to the solenoid coil, and varying the frequency of the driving signal such that the frequency of the driving signal is continuously varied over time during output of the driving signal.

* * * * *